United States Patent
Chen et al.

(10) Patent No.: US 6,286,916 B1
(45) Date of Patent: Sep. 11, 2001

(54) COMPUTER BEZEL HAVING A PIVOTABLE DRIVE COVER

(75) Inventors: Yun-Long Chen, Chung-Ho; Yu-Tai Liu, Hsin-Chuang; Kuang-Yu Chen, Tu-Chen; Alvin Liu, Pa-Li, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/506,108

(22) Filed: Feb. 17, 2000

(30) Foreign Application Priority Data

Dec. 28, 1999 (TW) ................................ 88222261

(51) Int. Cl.[7] .................................................. A47B 81/00
(52) U.S. Cl. ...................................... 312/223.2; 312/265.6
(58) Field of Search ............................. 312/223.1, 223.2, 312/265.5, 265.6, 293.2, 293.3, 327, 328; 361/681, 683, 724, 685

(56) References Cited

U.S. PATENT DOCUMENTS

| 5,423,605 | * | 6/1995 | Liu ..................................... 312/265.6 |
| 5,924,782 | * | 7/1999 | Park .............................. 312/223.2 X |
| 5,926,916 | * | 7/1999 | Lee et al. ......................... 361/724 X |
| 6,102,501 | * | 8/2000 | Chen et al. ................... 312/265.6 X |
| 6,144,549 | * | 11/2000 | Moss et al. ................... 312/223.1 X |

* cited by examiner

Primary Examiner—Jose V. Chen
Assistant Examiner—James O. Hansen
(74) Attorney, Agent, or Firm—Wei Te Chung

(57) ABSTRACT

A computer bezel is adapted for mounting on a computer enclosure having a data storage device attached thereto. The computer bezel comprises a base and a drive cover attached to the base. The base has a pair of arms and the drive cover is pivotable about the arms of the base. The drive cover is adapted to be pivoted about the computer enclosure for exposing the computer enclosure to an outer space thereby facilitating assembling of the data storage device to the computer enclosure.

11 Claims, 4 Drawing Sheets

COMPUTER BEZEL HAVING A PIVOTABLE DRIVE COVER

BACKGROUND OF THE INVENTION

1. Field of the Invention

The present invention relates a computer bezel, particularly to a computer bezel having a pivotable drive cover.

2. The Related Art

A computer generally has a data storage device, such as a floppy disk drive or a CD-ROM drive, attached to a computer enclosure for storing and accessing data. A side panel or a top panel of the computer enclosure is detachable associated with the computer enclosure for facilitating assembling of the data storage device to the computer enclosure. However, the side panel or top panel is usually attached to the computer enclosure by bolts, so the disassembling thereof from the computer enclosure is time-consuming and laborious.

To counter the above problem, a data storage device is attached to a computer enclosure through an opening defined in the computer enclosure. Though a front panel integrated with the computer enclosure is not required to be detachable from the computer enclosure during assembling of the data storage device, a bezel which engages with and blocks the front panel is required to be detached from the computer enclosure when an operator needs to assemble the data storage device to the computer enclosure. The bezel is assembled with a power switch and some direction lamps, so detaching the bezel from the computer enclosure is laborious.

Normally, the bezel is configured to the computer enclosure in a specific manner according to the mating structures thereof. Therefore, when configuration of the computer enclosure is changed, the bezel is required to be replaced with another one thus incurring additional cost.

SUMMARY OF THE INVENTION

Accordingly, an object of the present invention is to provide a computer bezel having a pivotable drive cove associated with a computer enclosure for facilitating assembling of a data storage device to the computer enclosure.

Another object of the present invention is to provide a computer bezel having a pivotable drive cover for accommodating to configuration of a computer enclosure or for taking on a new look.

To achieve the mentioned objects, a computer bezel of the present invention is provided to comprise a base and a drive cover attached to the base. The base has a pair of arms and the drive cover is pivotable about the arms of the base. The drive cover is adapted to be pivoted about the computer enclosure for exposing the computer enclosure to an outer space thereby facilitating assembling of the data storage device to the computer enclosure.

BRIEF DESCRIPTION OF THE DRAWINGS

Other objects and advantages of the present invention will be understood from the following description of a computer bezel according to preferred embodiment of the present invention shown in the accompanying drawings, in which.

DETAILED DESCRIPTION OF THE PREFERRED EMBODIMENT

Figure 1:
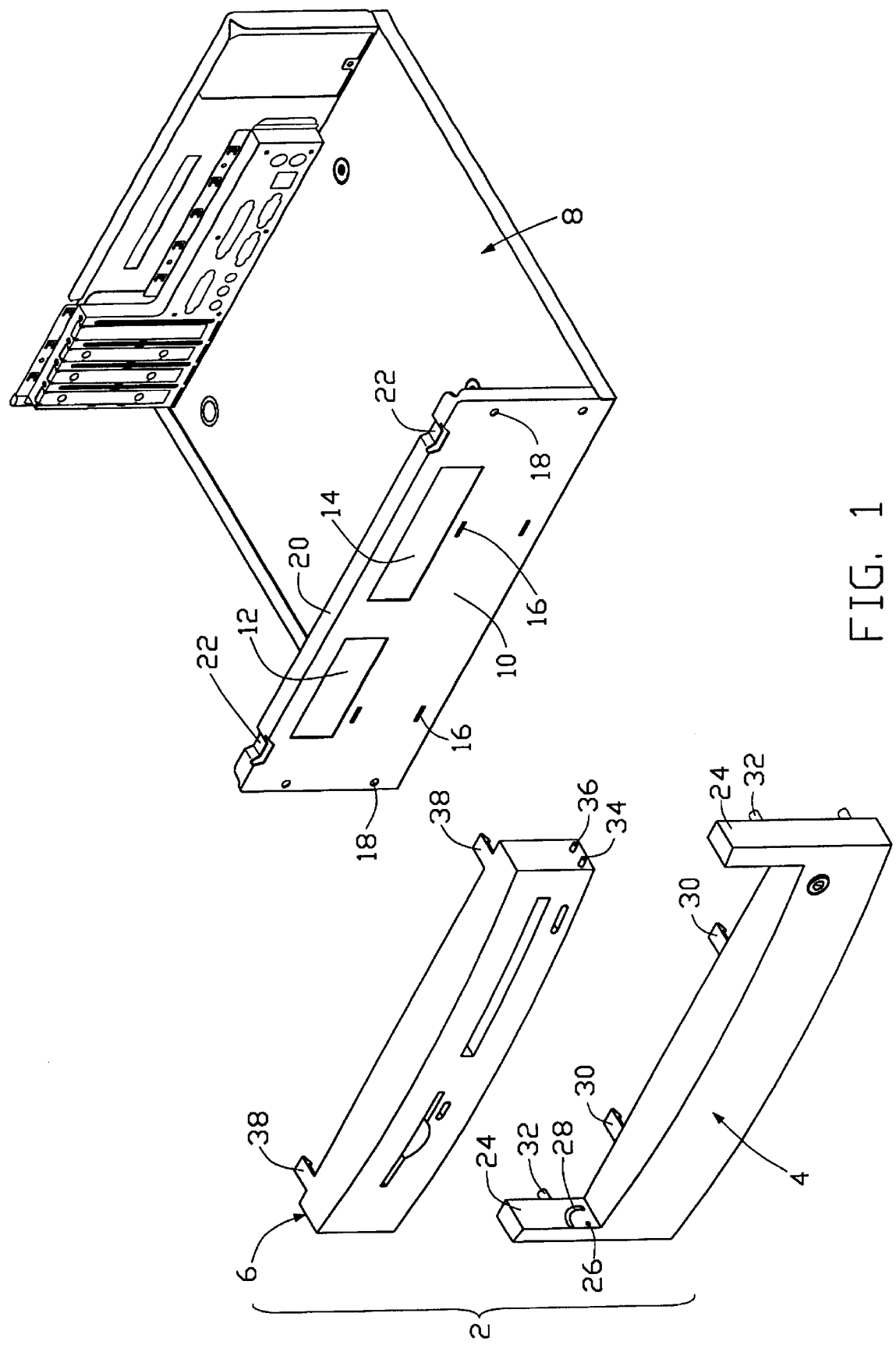
FIG. 1 is an exploded view of a computer bezel of the present invention and a computer enclosure to be attached thereto.

Referring to FIG. 1, a computer bezel 2 of the present invention includes a base 4 and a drive cover 6 pivotably attached to the base 4 and together attached to a computer enclosure 8. The computer enclosure 8 has a front panel 10 defining first and second openings 12, 14 for providing access to data device devices (not shown). Two pairs of fixing slots 16 are defined in the front panel 10 below the first and the second openings 12, 14. Two pairs of positioning holes 18 are defined near opposite sides of the front panel 10. A top flange 20 extends from the front panel 10 and defines a pair of fixing recesses 22.

Figure 2:
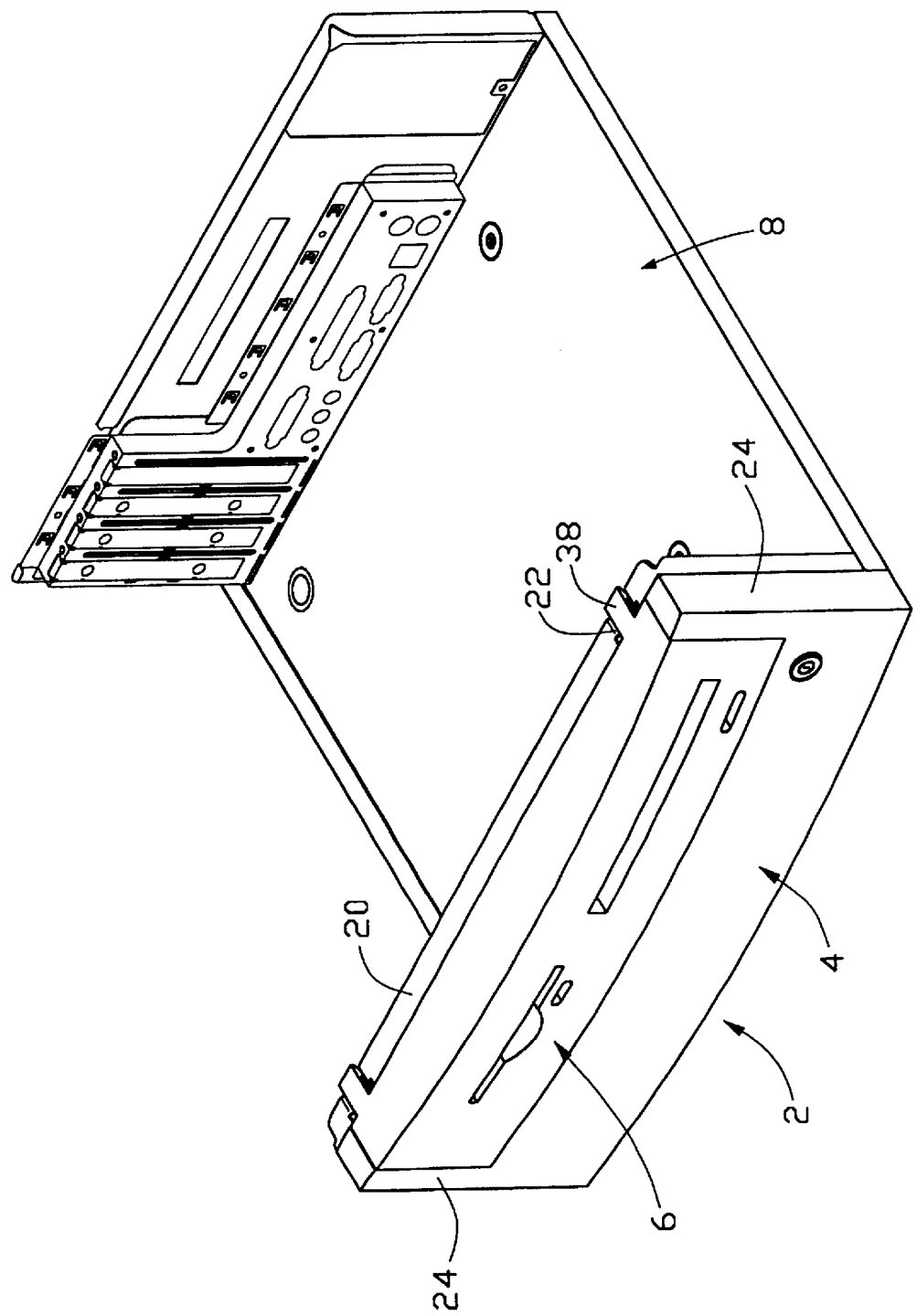
FIG. 2 is an assembled view of FIG. 1.

Referring to FIGS. 1 and 2, a pair of arms 24 extends from opposite sides of the base 4 for receiving the drive cover 6 therebetween. Each arm 24 defines a pivoting aperture 26 and an arcurate recess 28 coaxial thereto. Two pairs of first latches 30 extend from the base 4 for engaging with the fixing slots 16 of the computer enclosure 8. Two pairs of positioning posts 32 extend near opposite sides of the base 4 for matingly extending through the positioning holes 18 of the computer enclosure 8. Thus, the base 4 of the computer bezel 2 is attachable to the computer enclosure 8 by extending the positioning posts 32 through the positioning holes 18 and engaging the first latches 30 with the fixing slots 16.

A pair of pivoting posts 34 and a pair of guiding posts 36 respectively extend from opposite sides of the drive cover 6 for respectively inserting into the pivoting apertures 26 of the base 4 and the arcuate recesses 28 of the base 4. Thus, the drive cover 6 is pivotable about the pivoting apertures 26 of the base 4 while the guiding posts 36 of the drive cover 6 slide along the arcuate recesses 28 of the base 4. A pair of second latches 38 extends from the drive cover 6 for engaging with the recesses 22 of the top flange 20 of the computer enclosure 8. Thus, the drive cover 6 is attachable to the computer enclosure 8.

Figure 3:
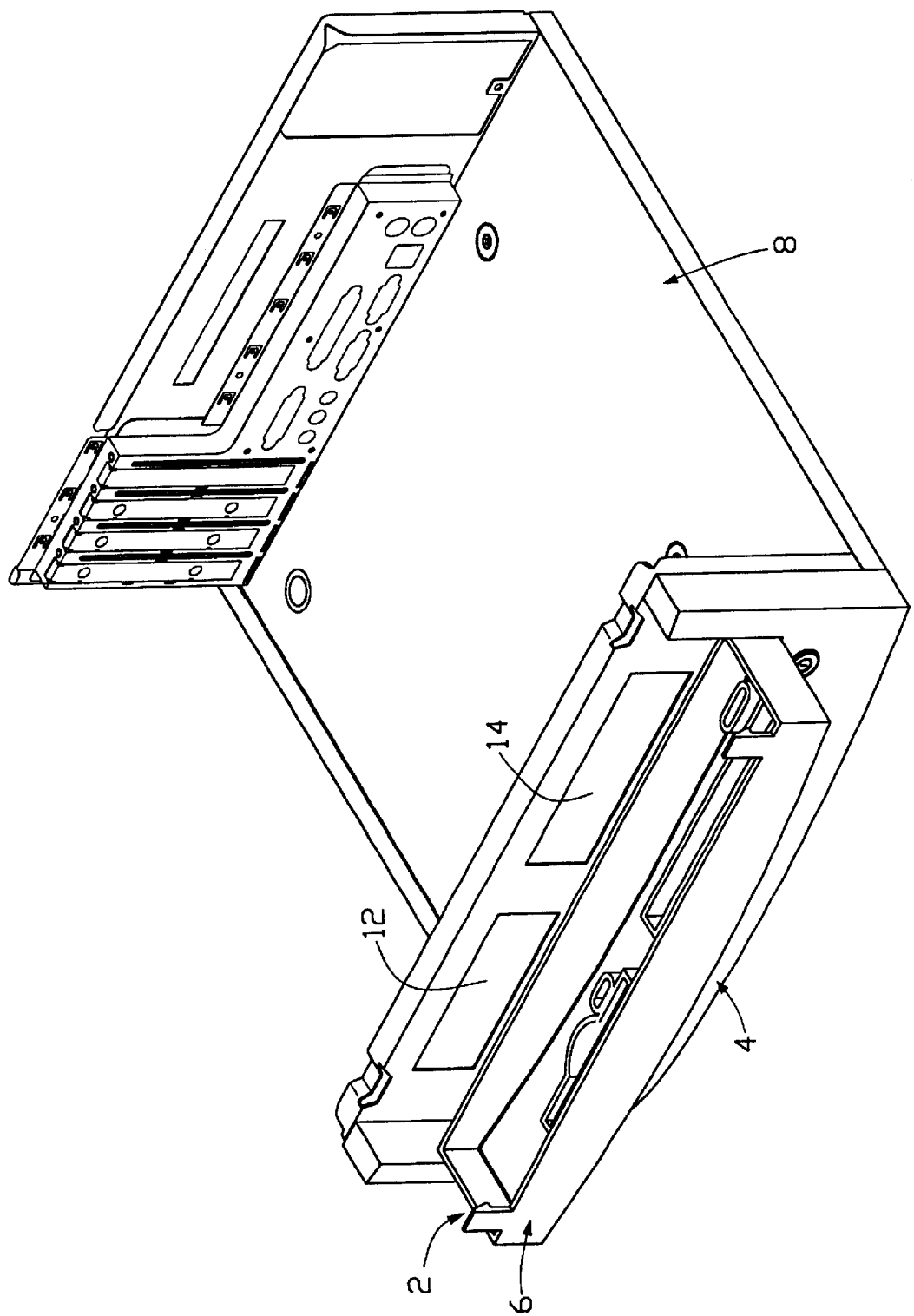
FIG. 3 is similar to FIG. 2 showing that a drive cover is pivoted from its normally vertical position to a horizontal position for providing a passage to mount a data storage device to the computer enclosure.

Referring from FIG. 2 to FIG. 3, the drive cover 6 of the computer bezel 2 is manually pivoted about the base 4 from a vertical position to a horizontal position, thereby creating a passage for mounting the data storage device to the computer enclosure 8. When the drive cover 6 is rendered to the horizontal position as shown in FIG. 3, the first and second openings 12, 14 of the computer enclosure 8 are fully exposed to an outer space and the data storage device is extendable through the first opening 12 or the second opening 14 and fixed to the computer enclosure 8. Thus, the data storage device is readily assembled to the computer enclosure 8 due to the pivotable feature of the drive cove 6.

Figure 4:
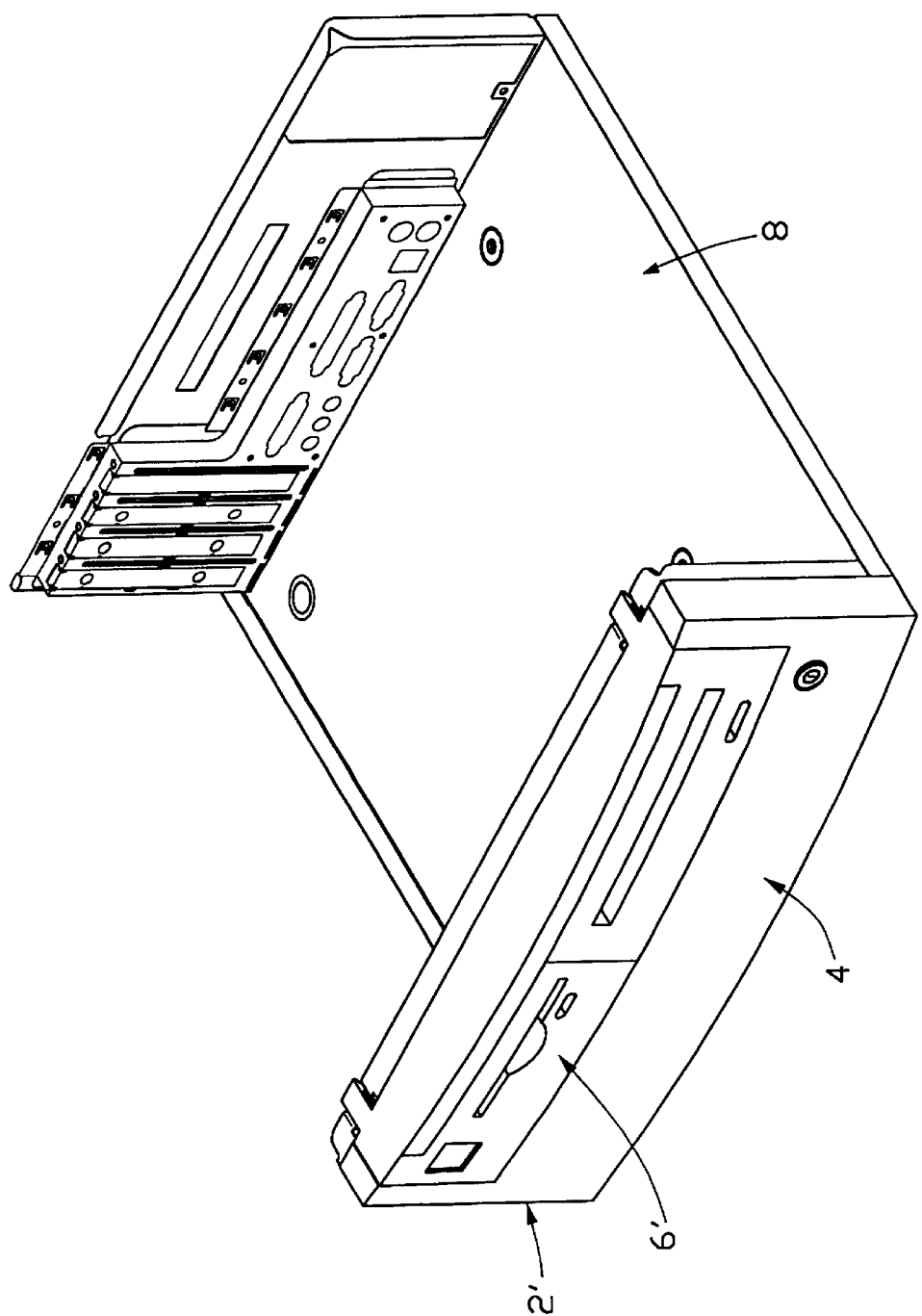
FIG. 4 is similar to FIG. 2 showing that the computer bezel is replaced with another drive cover.

Referring to FIG. 4, another type of drive cover 6' is assembled to the base 4 to form another computer bezel 2' for accommodating to reconfiguration of the computer enclosure 8 to result in a new look. The latter drive cover 6' has the same structure as the former drive cover 6 to pivotably connect to the base 4 for achieving the same purpose. Thus, a computer bezel 2 or 2' is economically replacable with each other in accordance with the configuration of the computer enclosure 8 or other needs due to the pivotable drive cover 6 or 6'.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer bezel pivotably mounted on a computer enclosure for accessing a data storage device which is to be received in the computer enclosure, the computer bezel comprising:

a base; and a drive cover pivotably engaged with the base in such a manner that the drive cover is in a vertical position when the data storage device is not to be moved into or from the computer enclosure and in a horizontal position when the data storage device is to be moved into or from the computer enclosure;

wherein a pair of arms extends from opposite sides of the base for receiving the drive cover therebetween;

wherein each arm defines a pivoting aperture in an inner surface thereof and the drive cover forms a pair of pivoting posts at opposite sides thereof for pivotable insertion into the pivoting apertures of the arms; and wherein each arm defines an arcurate recess in an inner surface thereof coaxially associated with the pivoting aperture, and a pair of guiding posts respectively extends from opposite sides of the drive cover for insertion into the arcuate recesses of the base.

2. The computer bezel as described in claim 1, wherein two pairs of first latches extend from the base adapted for engagingly extending through the computer enclosure.

3. The computer bezel as described in claim 1, wherein two pairs of positioning posts extend from the base adapted for matingly extending through the computer enclosure.

4. The computer bezel as described in claim 1, wherein a pair of second latches extends from the drive cover adapted for detachably engaging with the computer enclosure.

5. A computer enclosure assembly adapted for receiving a data storage device therein, comprising:

a computer enclosure having a panel defining an opening adapted for providing access to the data storage device; and a computer bezel attached to the panel of the computer enclosure and comprising:

a base; and a drive cover pivotably attached to the base and adapted for facilitating assembling the data storage device to the computer enclosure through the opening thereof;

wherein a pair of arms extends from opposite sides of the base of the computer bezel for receiving the drive cover of the computer bezel therebetween;

wherein each arm of the base defines a pivoting aperture in an inner surface thereof and the drive cover forms a pair of pivoting posts at opposite sides thereof for pivotably inserting into the pivoting apertures of the arms; and wherein each arm of the base defines an arcurate recess in an inner surface thereof coaxially associated with the pivoting aperture, and a pair of guiding posts respectively extends from opposite sides of the drive cover for respectively inserting into the arcuate recesses of the base.

6. The computer enclosure assembly as described in claim 5, wherein two pairs of fixing slots are defined in the front panel of the computer enclosure, and wherein two pairs of first latches extend from the base adapted for engagingly extending through the fixing slots of the computer enclosure.

7. The computer enclosure assembly as described in claim 5, wherein two pairs of positioning holes are defined in opposite sides of the front panel of the computer enclosure, and wherein two pairs of positioning posts extend from opposite sides of the base adapted for matingly extending through the positioning holes of the computer enclosure.

8. The computer enclosure assembly as described in claim 5, wherein a top flange extends from the front panel of the computer enclosure and defines a pair of fixing recesses therein, and wherein a pair of second latches extends from the drive cover adapted for extending through the recesses of the flange and engaging with the flange of the computer enclosure.

9. A computer bezel adapted for mounting on a computer enclosure having a data storage device attached thereto, comprising:

a base having a pair of arms; and a drive cover attached to the base and pivotable about the arms of the base, the drive cover being adapted to pivot about the computer enclosure for exposing the computer enclosure to an outer space thereby facilitating assembling a data storage device to the computer enclosure;

wherein the pair of arms extends from opposite sides of the base and the drive cover is received between the arms;

wherein each arm defines a pivoting aperture in an inner surface thereof and the drive cover forms a pair of pivoting posts at opposite sides thereof for pivotably inserting into the pivoting apertures of the arms; and wherein each arm defines an arcurate recess coaxially associated with the pivoting aperture, and a pair of guiding posts respectively extends from opposite sides of the drive cover for inserting into the arcuate recesses of the base.

10. The computer bezel as described in claim 9, wherein a pair of second latches extends from the drive cover adapted for engaging with the computer enclosure.

11. A computer enclosure assembly adapted for receiving a data storage device therein, comprising:

a computer enclosure including a front panel defining an opening adapted for providing access to the data storage device;

a computer bezel positioned in front of the panel, said bezel comprising:

a base covering most portions of the front panel, and a drive cover generally covering remaining portions of the front panel including said opening; wherein said drive cover is pivotably positioned on the base, and said base and said drive cover include means for fastening to the front panel, respectively.

* * * * *